Patented June 25, 1929.

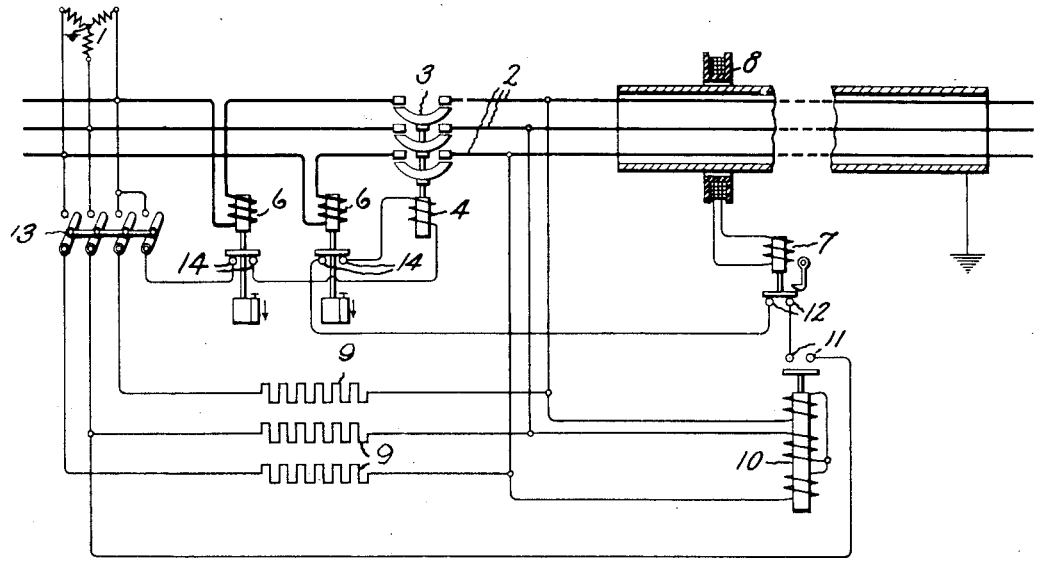

1,718,516

UNITED STATES PATENT OFFICE.

ARVID E. ANDERSON, OF LANSDOWNE, PENNSYLVANIA, ASSIGNOR TO GENERAL ELECTRIC COMPANY, A CORPORATION OF NEW YORK.

AUTOMATIC RECLOSING CIRCUIT-BREAKER SYSTEM.

Application filed February 11, 1928. Serial No. 253,768.

My invention relates to automatic reclosing circuit breaker systems and particularly to a system for controlling the connection between an alternating current source and an alternating current load circuit.

One object of my invention is to provide an improved arrangement for selectively controlling the operation of the reclosing of the circuit breaker in accordance with the character of the abnormal condition which caused the circuit breaker to open. In systems of electric distribution in which cables are employed it is customary to connect both the sheath of the cable and the source to ground so as to reduce the potential of the sheath in case of a fault between any cable conductor and the sheath. For example in polyphase grounded neutral systems of alternating current distribution in which a cable is employed the neutral of the source is grounded and the cable sheath is either connected directly to ground or conductively to the neutral of the source. In single phase systems the mid point of the system and the cable sheath are usually grounded. In such systems a permanent fault between any one of the conductors in the cable and the cable sheath is liable to result in considerable damage to the cable before the fault burns itself clear. In accordance with my invention I provide an arrangement whereby the circuit breaker between the source and the load circuit is arranged to be reclosed automatically only when it is opened by a fault other than a fault between a load circuit conductor and the cable sheath.

My invention will be better understood from the following description, taken in connection with the accompanying drawing and its scope will be pointed out in the appended claims.

In the accompanying drawing which shows diagrammatically a system of electric distribution embodying my invention, 1 represents a suitable source of alternating current, shown as a three-phase star-connected generator with the neutral point grounded. This ground connection may be made directly or through a current limiting resistor or other suitable device. The generator 1 is arranged to be connected to a three-phase load circuit 2 by suitable switching means 3 examples of which are well known in the art. As shown the switching means 3 is provided with a closing coil 4 which when energized closes and maintains the switch 3 closed. As shown the load circuit includes a cable the sheath of which is grounded. The ground therefore conductively connects the sheath to the neutral of the source 1. If desired, however, it is obvious that the connection between the sheath and the generator neutral may be replaced by a solid metallic connection.

Any suitable means, examples of which are well known in the art, may be provided for effecting the opening of the circuit breaker 3 in response to a phase to phase fault on the load circuit and in response to a fault between a load circuit conductor and the neutral connection to the generator 1 which in the arrangement shown includes the grounded sheath of the cable. In the embodiment of my invention shown in the drawing this result is effected by means of the overload relays 6 connected in series with different phase conductors of the load circuit so as to be energized in accordance with the current in the respective phase conductors and a ground fault responsive relay 7 so connected to the load circuit 2 in any suitable manner, examples of which are well known in the art, that it is energized only in accordance with the current flowing through the connection between the sheath of the cable and the neutral of the source 1. As shown, the relay 7 is connected to the secondary of a suitable bushing current transformer 8 examples of which are well known in the art, so that as long as the sum of the currents in the phase conductors at the point the transformer is connected is substantially zero, which is the case when no fault exists between a conductor and the sheath, sufficient current does not flow through the coil of relay 7 to operate it. When, however, a fault occurs between a conductor and the sheath at a point in the load circuit further away from the source than the point where the transformer 8 is connected, some of the current returns to the generator through the ground so that the sum of the currents in the phase conductors at the point at which the transformer 8 is connected is no longer zero and therefore a current of sufficient value flows through the coil of the relay 7 to operate it. Preferably the relays 6 and 7 are arranged in any suitable manner examples of which are well known in the art so that if the fault between a phase conductor and the neutral connection causes an excessive current to flow in one or more of the phase conductors, the associated overload relay 6 does not operate as quickly as the relay 7.

Both the overload relays 6 and the neutral fault responsive relay 7 are arranged to control the circuit of the closing coil 4 so as to effect the opening of the circuit breaker 3.

Any suitable means, examples of which are well known in the art, may be provided for effecting normally the reclosing of the circuit breaker 3 after it has been opened. The particular means diagrammatically shown in the drawing includes a load indicating impedance 9 for each phase of the load circuit which are arranged to be connected in series between the source and the load circuit when the switch 3 is open, and a suitable polyphase voltage relay 10 connected across the load circuit. The voltage relay is designed in any suitable manner examples of which are well known in the art so that it requires a predetermined voltage to exist across each phase of the load circuit before it will close its contacts 11 which are in the circuit of the closing coil 4. Therefore, after the switch 3 is opened by a fault between phases, the switch 3 can not be reclosed until the fault has been removed so that the voltage across the faulty phase, produced by the reduced current flowing through the impedances 9, is above a predetermined value.

In order to prevent the relay 10 from effecting the reclosing of the switch 3 when the opening thereof is due to the operation of the neutral fault responsive relay 7, this relay, whose contacts 12 are in series with the contacts 11 in the circuit of the closing coil 4, is arranged in any suitable manner examples of which are well known in the art so that it remains in its contact open position until it is reset manually.

13 is a control switch which is provided for effecting the permanent opening of the switch 3 and the deenergization of the associated control devices.

The operation of the equipment shown in the drawing is as follows: When the control switch 13 and the main switch 3 are closed and the load circuit conditions are normal, the circuit for the closing coil 4 includes in series the contacts 14 of the overload relays 6, contacts 12 of the neutral fault responsive means and the contacts 11 of the relay 10.

When a fault occurs between any two of the conductors which causes one of the overload relays 6 to operate, and open its contacts 14, the circuit of the closing coil 4 is opened and the circuit breaker 3 opens so that the impedances 9 are connected in series between the source and the load circuit. The fault also causes the relay 10 to open its contacts 11 and these contacts remain open as long as the fault remains connected to the load circuit. Any suitable means, examples of which are well known in the art, may be provided for preventing the reclosing of the circuit breaker 3 for a predetermined time after the circuit breaker opens.

This result for example may be accomplished by designing the overload relays 6 so that they do not reclose their contacts 14 until a predetermined time after the coils thereof are deenergized. After this predetermined time has elapsed and the fault has been removed so that relay 10 closes its contacts 11 the circuit of the closing coil is reestablished so that the circuit breaker 3 is reclosed.

If desired, suitable means examples of which are well known in the art may be provided so as to limit the number of times a circuit breaker may be reclosed.

When a fault occurs between any load circuit conductor and the sheath of the cable, a current of sufficient value flows through the coil of the relay 7 so that this relay is actuated to its lockout position, in which position its contacts 12 are open. The opening of the contacts 12 effects the deenergization of the closing coil 4 so that the circuit breaker 3 opens. Since the relay 7 is held in its lockout position the circuit of the closing coil 4 remains open and therefore further reclosing of the circuit breaker 3 is prevented until the relay 7 is reset manually to its normal position.

When a fault occurs which effects the energization of the relay 7 as well as effecting the operation of one or more of the overload relays 6, the reclosing of the circuit breaker is prevented, as the relay 7 is designed to operate and open its contacts 12 before the relays 6 open their contacts 14.

While I have in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a star connected alternating current source, a load circuit, a circuit breaker connecting said source and load circuit, means responsive to an abnormal circuit condition of said load circuit for opening said circuit breaker, means operative when said circuit breaker is open for effecting the reclosing thereof, and means responsive to a fault between one of the load circuit conductors and the neutral of said source for preventing said reclosing means from effecting the subsequent reclosing of said circuit breaker.

2. In combination, a polyphase alternating current source having a grounded neutral, a polyphase load circuit, a circuit breaker connecting said source and load circuit, means responsive to a phase to phase fault on said load circuit for effecting the opening of said circuit breaker, means for effecting the subsequent reclosing of said circuit breaker, and means responsive to a ground fault on said load circuit for effecting the opening of said circuit breaker and for preventing the subsequent reclosure thereof.

3. In combination, a polyphase alternating current source having a grounded neutral, a polyphase load circuit including a cable having a grounded sheath, a sheath transformer, a circuit breaker connecting said source to said load circuit, means responsive to a phase to phase fault on said load circuit for effecting the opening of said circuit breaker, reclosing means for effecting the reclosing of said circuit breaker when open, and electroresponsive means connected to the secondary of said sheath transformer for effecting the opening of said circuit breaker and for preventing said reclosing means from effecting the subsequent reclosing of said circuit breaker.

4. In combination, a grounded source of current, an ungrounded load circuit, means responsive to an abnormal circuit condition of said load circuit for opening said circuit breaker, means operative when said circuit breaker is open for effecting the automatic reclosing thereof, and means responsive to a fault between said load circuit and ground for preventing said reclosing means from effecting the subsequent reclosing of said circuit breaker.

5. In combination, a grounded source of current, an ungrounded load circuit including a cable having a grounded sheath, a circuit breaker connecting said source to said load circuit, means responsive to a phase to phase fault on said load circuit for effecting the opening of said circuit breaker, reclosing means normally arranged to effect the reclosing of said circuit breaker when open, and means responsive to a fault between said load circuit and said cable sheath for effecting the opening of said circuit breaker and for preventing said reclosing means from effecting the subsequent reclosing of said circuit breaker.

In witness whereof, I have hereunto set my hand this 9th day of February, 1928.

ARVID E. ANDERSON.